Feb. 10, 1959    A. E. BIXENMAN    2,872,749
AQUARIUM DISPLAY DEVICE
Filed July 16, 1957
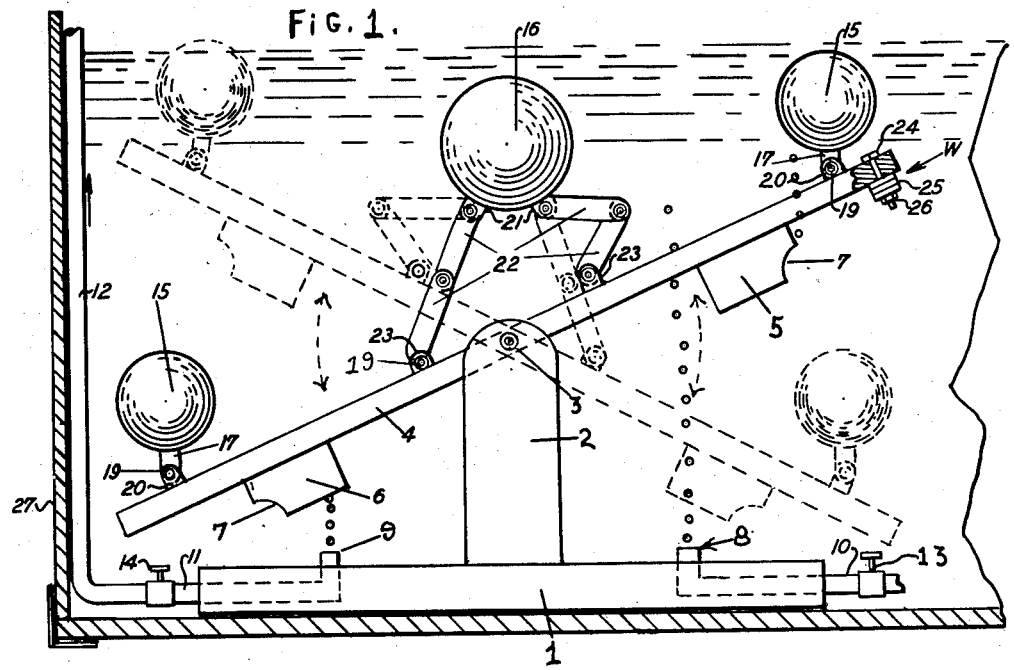
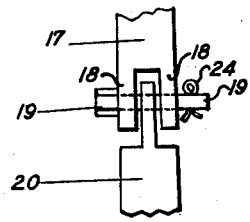
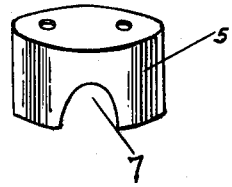
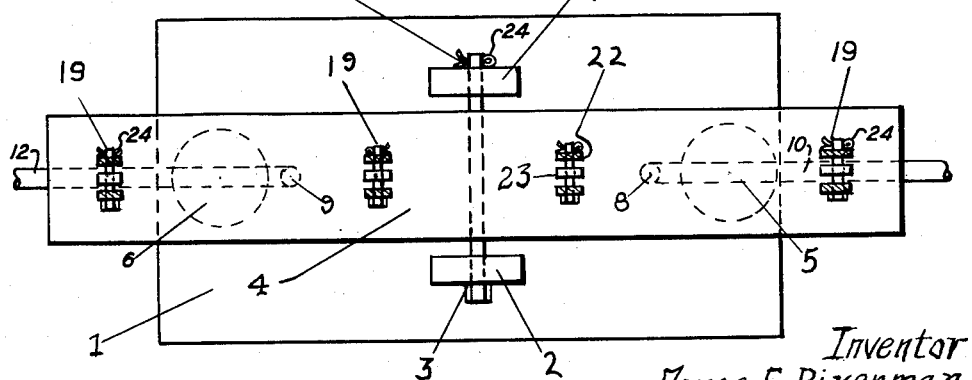
Inventor
James E. Bixenman

United States Patent Office 2,872,749
Patented Feb. 10, 1959

2,872,749

AQUARIUM DISPLAY DEVICE

Ames E. Bixenman, Winter Haven, Fla.

Application July 16, 1957, Serial No. 672,250

10 Claims. (Cl. 40—37)

This invention is a water aerating and circulating apparatus for use in aquariums and includes a movable display device to be submerged in an aquarium and to be actuated by bubbles rising from a submerged air discharge means operatively associated therewith so that the water within the aquarium may be simultaneously mechanically agitated and aerated.

One object of the invention is to provide an apparatus of the character described which may be submerged in an aquarium to provide a visible attractive movable display device functioning by its movement to circulate or agitate the water within the aquarium, and to actuate said display device by air discharged into the aquarium for the purpose of aerating same.

Another object of the invention is to provide a buoyancy motor of novel construction which is arranged to actuate the display device by air discharged into the aquarium below the surface of the water therein.

Another object of the invention is to provide movable buoyant figures in the display device and connected thereto in a manner to cause the same to partake of articulated movements when the apparatus is operated by air entering the aquarium at a submerged point.

Another object of the invention is to provide an apparatus of the character described which includes a pivotally mounted member arranged to oscillate up and down about its pivot by the buoyancy of air bubbles trapped within cups carried thereby and designed to discharge the trapped air at a predetermined point in its upward movement, thereby to destroy the buoyancy of the elongated member causing the same to move downwardly to receive another charge of buoyant air from an air inlet located beneath the pivoted member.

Another object of the invention is to associate with an oscillating pivoted member such as described, buoyant figures connected thereto by pivoted links so that as the said member oscillates, the buoyant figures will move in respect thereto.

These and other objects will become apparent from the following specifications when considered in the light of the accompanying drawing wherein is illustrated a preferred embodiment of the invention and wherein:

Fig. 1 is a side elevation of the invention shown positioned within an aquarium with parts of the aquarium broken away;

Fig. 2 is a detail view of a joint by which the buoyant figures may be connected to the pivoted member;

Fig. 3 is a perspective view of an air cup;

Fig. 4 is a plan view of the apparatus with the buoyant figures removed.

Referring more particularly to the accompanying drawing, wherein like reference numerals are used to designate like parts throughout, the apparatus comprises a base 1 of any conventional form, the base in the present disclosure being shown generally rectangular. Intermediate the ends of the base 1, and preferably centrally of the base are upright members 2, 2, said members being spaced apart and carrying at their upper ends a pivot pin 3. The pin 3 provides pivotal support for an elongated member 4 which is provided with a central aperture passing therethrough from edge to edge and through which aperture the pivot pin 3 is passed. Air trapping cups 5 and 6 are secured to the under side of the elongated member 4 at points substantially equally spaced from the pivotal axis of the member 4. The cups 5 and 6 open downwardly and the wall of said cups at points remote from the pivotal axis of the member 4 are apertured or notched as shown at 7 for a purpose hereinafter fully explained.

The apparatus includes means for delivering air to the water of the aquarium for the purpose of aerating the same and to this end air nozzles 8 and 9 are provided to which air from a source (not shown) is delivered by conduits 10 and 11. The conduits 10 and 11 may be connected to said source of air pressure by any suitable means such as the conduit 12, shown in Fig. 1 as extending up the side wall of the aquarium and over the top thereof. The conduits 10 and 11 may be provided with air control valves 13 and 14 to regulate the rate of discharge of air from the associated nozzles 8 and 9. These valves although shown within the aquarium, may obviously be placed anywhere in the air lines 10, 11 or 12, either within or outside of the aquarium.

Buoyant figure members 15 and 16 are shown connected to the elongated member 4, there being two such members 15 mounted near the terminal portions of the elongated member 4 while the central buoyant figure 16 is connected to points on opposite sides of the pivotal axis of the elongated member 4. The buoyant figures 15 and 16 are shown, for convenience, as spherically formed members but it will be understood that these figures may be designed in any desired form or contour to represent either aquatic or human figures and may bear distinguishing features to characterize a particular animal such as a frog, a fish, or a human figure. Furthermore, the members 15 and 16 are connected to the elongated member 4 in a manner such that due to their buoyancy the oscillating movement of the elongated member 4 when in operation, will cause said figures 15 and 16 to partake of relative movement with respect to the elongated member to which they are attached. Thus each of the members 15 is provided with an apertured attaching lug 17 which, if desired, may be bifurcated as at 18, as shown in Fig. 2, the legs of the bifurcation being apertured to take a pivot pin 19 by which the lugs 17 may be connected to lugs 20 carried by the elongated member 4. In a similar manner the central buoyant figure 16 is provided with a pair of spaced attaching lugs 21 which are each connected to the elongated member 4 by a pair of pivotally connected links 22, the latter being pivotally connected to the elongated member 4 by apertured lugs 23 carried by said member on opposite sides of and at substantially equal distances from the pivotal axis of the said member 4. It will be understood that as the elongated member 4 is oscillating about its pivot in a manner to be hereinafter described, the buoyant figures 15 will oscillate about their respective pivotal connections while the links 22 which connect the buoyant figure 16 to the elongated member 4, will articulate in the manner suggested by the full and dotted line showings in Fig. 1, said linkages alternately and oppositely contracting and expanding.

In operation, with the apparatus submerged in an aquarium as shown, when air is delivered to the pipes 10 and 11 and the valves 13 and 14 adjusted, a series of air bubbles will rise from the nozzles 8 and 9 and with the parts in the position shown in full lines in Fig. 1, the air bubbles from the nozzle 9 will enter and be trapped within the inverted cup 6. The apparatus is designed and proportioned so that the buoyancy of the air thus entrapped within this cup 6 will cause the left-hand end of the elongated member 4 to rise while the opposite end thereof will fall, the member 4 ultimately reaching the dotted line position shown in Fig. 1. Upon reaching this point, air entrapped within the cup 6 spills out through the notch or aperture 7 (as shown in full lines in respect to the cup 5 at the right-hand end of the member 4), with the result that the cup 6 from which the air has been lost loses its buoyancy and the left-hand end of the member 4 starts to sink. During the period when the cup 6 is at the top of its arc of swinging movement and is there losing its entrapped air, the cup 5 at the other end of the member 4 is in the position shown in dotted lines in Fig. 1 and in this position receives air from the nozzle 8. The air thus entrapped in the cup 5 gives buoyancy to the right-hand end of the member 4 with the result that it rises to the full-line position shown in Fig. 1. At this position it spills the entrapped air from the notch 7 and the operation is repeated.

Although I have shown the member 4 provided with two air-trapping cups, the apparatus may, if desired, be operated with a single such cup, such as the cup 5 shown at the right-hand end of the member 4, if means are provided with biasing this end of the member 4 to its lowermost position. Any convenient form of biasing means may be provided such as a biasing spring (not shown) associated with the pivot pin 3 or a biasing weight W such as shown at the extreme right-hand end of the member 4. The biasing weight may be attached to the member 4 by a bolt 24 carrying a series of washers 25 secured on the bolt by a nut 26. By selecting the proper number and weight of the washers 25, the desired amount of biasing force may be provided.

It will be appreciated that the amount of biasing force necessary to cause the member 4 to descend after air has been spilled from the cup 5 is relatively small and may be provided by the position and weight of the cup 5 when empty, if desired. Also, it will be understood that a slight overbalance on one end of the elongated member 4 is desirable even when two air cups are used as shown in Fig. 1, since by this means it is impossible for the member 4 to assume and retain its substantially horizontal position if and when the air supply to the nozzles 8 and 9 fails or is turned off. The overbalanced end of the member 4 under these conditions will always sink, bringing the air cup associated with that end into air charging position with one of the air discharge nozzles 8 or 9.

As shown in Fig. 1, the apparatus is designed primarily for use in connection with an aquarium including transparent side walls such as shown at 27 but it will be understood that it is applicable and will function equally well in connection with any apparatus wherein it is desired to aerate and circulate or agitate the liquid contents thereof. The apparatus may be constructed of any desired material such as wood, metal, plastic or ceramic, and the buoyant figures may be similarly made of glass, plastic, metal or the like, and may be hollow or solid so long as they possess the necessary buoyancy when submerged in the liquid in which the apparatus is to be used. The pivot pins 3 and 19 as shown may be headed at one end and provided with cotter pins or the like 24 at the opposite ends to retain the pins in place during operation.

It will be understood that the cup members 5 and 6 are positioned on the elongated member 4 and with respect to the nozzles 8 and 9 respectively, so that at or near the bottom of the arc of swinging movement through which they operate as the elongated member is oscillated, they will alternately be brought to substantial alignment with the nozzles and thus receive a charge of air therefrom. However, as the cups move upwardly under the buoyancy of the trapped air, they respectively move outwardly beyond the rising stream of air bubbles (as shown in full lines in Fig. 1 in respect to cup 5) so that the air which spills from the cups through the notches 7 at the upper end of the arc of swinging movement, will not be replenished by the rising stream of air bubbles. Thus, it is insured that the cups will not receive air unless and until they are again at the lower portion of their swinging movement and over the respective nozzles 8 and 9. This insures continued oscillation of the elongated member so long as the air is discharged from the nozzles 8 and 9.

Having thus described my invention, it is apparent that I have provided an attractive moving display apparatus for use in an aquarium and visible through the transparent walls thereof, and which is operable by the air normally supplied thereto for aerating the water therein, and which will in operation simultaneously circulate the liquid contents thereof. However, it will be understood that the embodiment of the invention shown in the drawings is but for the purpose of illustration and those persons skilled in the art will realize that various changes in size, proportion and arrangement of parts there shown may be made without departing from the spirit of the invention as set forth more completely in the appended claims.

What I claim as new is:

1. A display device for agitating and aerating the water in an aquarium comprising a base member, an elongated member, means mounting the elongated member on the base member for up and down swinging pivotal movement about a generally horizontal axis, a downwardly open air cup member carried by the elongated member at a point remote from the pivotal axis thereof, means causing the elongated member normally to assume a position adjacent to the lower limit of its range of up and down swinging movement, means for charging air into said cup when the elongated member is near the lower limit of its downward range of swinging pivotal movement whereby when the apparatus is submerged in water, said air will be trapped within the cup, rendering it buoyant and causing the elongated member to swing upwardly about said pivot, and means for discharging said trapped air from said cup near the upper limit of swinging pivotal movement of said elongated member thereby causing said elongated member to return to its normal position for recharging the cup with air.

2. The apparatus described in claim 1 wherein the means for discharging air from the cup near the upper limit of its swinging movement comprises an air discharge opening in the wall of the cup located to spill air from the cup upon said elongated member reaching a predetermined upwardly inclined position.

3. The apparatus described in claim 1 wherein buoyant figures are attached to said elongated member by flexible linkage whereby said figures articulate with respect to said elongated member as the latter changes its angular position about its pivotal axis.

4. The apparatus described in claim 3 wherein at least one of said buoyant figures is attached to said elongated member at points on opposite sides of the pivotal axis thereof by articulated linkage means, each of which includes a pair of pivotally connected links whereby the linkage means on opposite sides of the pivotal axis of said elongated member are alternately collapsed and extended as said elongated member oscillates.

5. The apparatus described in claim 1 wherein said elongated member is pivoted intermediate its ends and wherein the elongated member is pivoted intermediate its ends and wherein a second downwardly open air cup is provided on said elongated member and positioned on the opposite side of the pivotal axis thereof, and wherein a second means is provided for charging air into said second cup near the lower portion of its arc of swinging movement, and wherein means is provided for discharging air from said second cup member near the upper limit of its range of pivotal movement.

6. In combination, an aquarium including a transparent vessel containing water, a combined display, water aerating and agitating apparatus therefor submerged within the water in said vessel, said apparatus including a base member, an upright support carried thereby, an elongated member pivotally supported on said upright member for oscillation about a substantially horizontal axis, a downwardly open air cup member carried by the elongated member at a point remote from said pivotal axis, means for causing said elongated member to assume a normal position near the lower limit of its pivotal movement, a submerged air discharge pipe adapted for connection to a source of air under pressure, and disposed beneath the elongated member in general alignment with the arc of swinging movement of said air cup when the elongated member is oscillated, said air discharge pipe being displaced laterally with respect to the pivotal axis of said cup, so as to discharge an upwardly rising stream of air bubbles into said body of water, some of said air bubbles being trapped within said cup near the bottom of its arc of swinging movement, thereby rendering the cup buoyant and swinging the cup upwardly, and means for discharging said air from said cup near the top of its arc of swinging movement thereby causing the elongated member to return to its normal position for receiving another charge of air.

7. The combination recited in claim 6 wherein buoyant figures are articulatedly connected to said elongated member whereby oscillating movement of the elongated member causes relative angular movement of the figures with respect thereto, which movements are visible through the transparent vessel of the aquarium.

8. A buoyant motor device comprising a vessel containing a body of liquid, a member non-buoyant in said liquid submerged therein and mounted within said vessel for pivotal up and down swinging movement about a substantially horizontal axis, an inverted cup member carried by said pivotally-mounted member at a point removed from the pivotal axis thereof, and an air discharge device adapted to be connected to a source of air under pressure and submerged within said body of liquid below said non-buoyant pivotally-mounted member at a point to direct air bubbles rising therefrom into said inverted cup member when the pivotal member is at the lower part of its range of pivotal swinging movement, whereby liquid within the inverted cup member is replaced by said air and the pivotally-mounted member thereby rendered buoyant causing the same to rise, said cup member being formed to discharge the air entrapped therein when the pivotally-mounted member reaches the upper limit of its range of pivotal movement, thereby restoring said pivotally-mounted member to its normal non-buoyant condition whereby it moves downwardly under the force of gravity to position the cup with respect to said air discharge device for receiving another charge of air.

9. The buoyant motor described in claim 8 wherein said cup member is provided with an air discharge notch in the side wall thereof positioned to spill air from the cup member when the pivotally-mounted member reaches a predetermined upwardly-inclined angular position.

10. A buoyant motor device comprising a vessel containing a body of liquid, an elongated member non-buoyant in said liquid and submerged therein, means within the vessel for mounting said elongated member for oscillating pivotal up and down movement about a substantially horizontal axis, a pair of inverted cup members carried by said elongated member, one on either side of said pivotal axis and remote therefrom, air discharge devices submerged within said body of liquid and positioned beneath said elongated member, said air discharge devices being disposed on opposite sides of said horizontal axis and in generally vertical alignment with the respective arcs of swinging movement of said cup members when the elongated member is oscillated about said pivotal axis, said air discharge devices being adapted for connection to a source of gaseous medium under pressure and each being arranged, when so connected, to discharge an upwardly rising stream of gaseous medium in the form of bubbles which intersect the arcs of swinging movement of the respective cup members at a low point in said arcs, whereby said cup members alternately trap gaseous medium from the bubbles in the respective streams to thereby render the corresponding end of the elongated member buoyant, causing it to rise, said cup members being formed to discharge the gaseous medium trapped therein when the corresponding end of the elongated member reaches a predetermined height in the arc of its swinging movement, thereby destroying the buoyancy of said end of the elongated member, causing it to sink.

References Cited in the file of this patent

UNITED STATES PATENTS

| | | |
|---|---|---|
| 257,505 | McMillan | May 9, 1882 |
| 1,639,550 | Bender | Aug. 16, 1927 |
| 1,724,770 | O'Neill | Aug. 13, 1929 |
| 2,513,136 | Borsos | June 27, 1950 |

FOREIGN PATENTS

| | | |
|---|---|---|
| 11,478 | Great Britain | June 12, 1893 |
| 993,456 | France | July 25, 1951 |